Patented Jan. 5, 1954

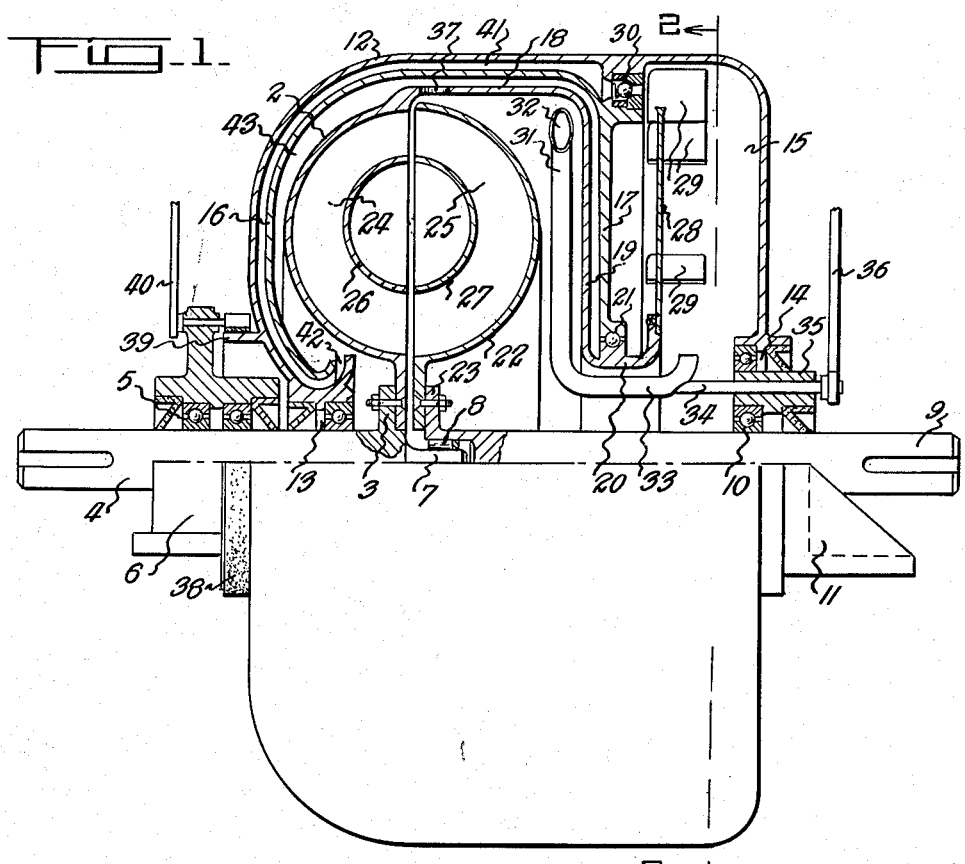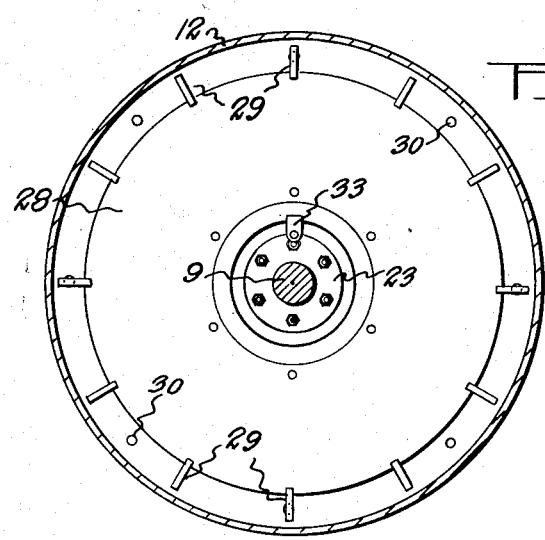

2,664,704

UNITED STATES PATENT OFFICE 2,664,704

ROTARY, TOROIDAL CHAMBER TYPE HYDRAULIC COUPLING AND FLUID CIRCULATING CONTROLS THEREFOR

John Edward Becker, Darlington Township, Durham County, Ontario, Canada

Application June 17, 1952, Serial No. 294,108

5 Claims. (Cl. 60—54)

My invention relates to fluid circulation controls for fluid couplings of the type wherein a fluid reservoir rotates in conjunction with a fluid coupling and wherein a swingable scoop pipe constitutes the means for removing fluid from the coupling and directing it into the reservoir.

The object of the invention is to provide a coupling of the foregoing general arrangement and in which the rotative movement of the fluid reservoir is brake controlled independently of the driving shaft and its connected impeller assembly; a pump wheel being contained within the fluid reservoir and connected to and driven by the impeller assembly, a plurality of check valves being provided within the partition wall separating the rotatable fluid coupling housing from the fluid reservoir and designed to open under hydrostatic pressure developed in the reservoir by the pump wheel to admit fluid from the reservoir into the coupling.

With the foregoing and other objects in view as shall appear, my invention consists of a fluid circulation control for fluid couplings constructed and arranged all as hereinafter more particularly described and illustrated in the accompanying drawing in which:

Fig. 1 is a side elevational view of the coupling and reservoir assembly, the upper portion thereof being shown in section.

Fig. 2 is a transverse cross-sectional view taken through the line 2—2, Fig. 1.

Like characters of reference indicate corresponding parts in the two views of the drawing.

An impeller housing 2 of concave ring shaped form is secured to a flange 3 on the inner end of a driving shaft 4 which is carried by a ball race 5 mounted within a supporting bracket 6. The inner end of the driving shaft 4 has a reduced diameter portion 7 extending into a needle bearing 8 contained within the inner end of the driven shaft 9. The driven shaft is carried by a roller race 10 within a supporting bracket 11 which is in alignment with the supporting bracket 6.

The entire coupling and reservoir assembly is contained within a rotatable shell 12 carried upon a pair of roller bearing and seal ring assemblies 13 and 14, the assembly 13 being mounted upon the driving shaft 4, and the assembly 14 mounted upon the supporting bracket 11. One end of the shell 12 constitutes the fluid reservoir 15, and the other end of the shell envelops and is spaced apart from an inner shell 16 surrounding the impeller housing 2.

The inner shell 16 follows the contour of the outer shell 12 at the driving shaft end of the assembly, and intermediately of the length of the shell 12 is formed with an inwardly directed radial skirting and which constitutes a partition wall 17 between the fluid reservoir 15 and the interior of the shell 16.

The impeller housing 2 carries a cylindrical extension 18 formed with an inwardly directed end wall 19 which is slightly spaced away from the reservoir partition wall 17 and formed with a hollow hub 20 which surrounds and is spaced away from the driven shaft 9. The hub 20 carries a ball race 21 upon which the reservoir partition wall 17 is rotatably carried.

A concave ring shaped runner housing 22 is contained within the cylindrical extension 18 of the impeller housing and has its central portion attached to a flange 23 on the inner end of the driven shaft 9. The impeller housing 2 and the runner housing 22 carry a plurality of the usual radial impeller and runner blades 24 and 25 which support the usual ring members 26 and 27, whereby passages for the fluid transmission of power are constituted.

To inject fluid from the reservoir 15 into the coupling, as shall be later described, a pump disc wheel 28 carrying peripheral blades 29 is secured to the flange of the hub 20 which is contained within the reservoir 15. The partition wall 17 contains a plurality of suitably spaced apart ball check valves 30 which provide one way passages from the reservoir to the coupling in the vicinity of the path of rotation of the pump wheel blades 29.

In order to remove fluid from the coupling and feed it into the fluid reservoir, a swingable scoop pipe 31 is positioned within the impeller housing extension 18, its outer end carrying a suitable intake orifice 32 directed counter to the direction of rotation of the centrifugal fluid ring which forms within the extension 18 when the coupling contains fluid. The scoop pipe is carried upon the end of a length of pipe 33 extending through the hollow hub 20 and opening at its other end into the fluid reservoir 15.

The pipe 33 is mounted upon the inner end of a rotatable spindle 34 extending through the bearing boss 35 and provided with a manipulating handle 36 whereby the scoop pipe may be swung into and out of its fluid ring. It being understood that as the scoop pipe is swingable about a point spaced away from the axis of the centrifugal fluid ring that it may be swung towards and away from the inner surface of the ring.

As the assembly unit formed by the outer shell 12, inner attached shell 16 and fluid reservoir 15 formed by the two shells is freely mounted upon the bearings 13 and 14 the unit will normally rotate under the action of the rotative movement of the fluid in the coupling assembly as the fluid therein is free to centrifugally flow from the peripheral portion of the impeller housing 2 to the interior of the shell 16 through the peripheral orifices 37 in the impeller housing extension 18. In order to govern the rotative movement of the assembly unit any suitable brake mechanism may be used, as for example, a brake band 38 surrounding the flange 39 on the coupling end of the shell 12 and actuatable under movement of a brake handle 40.

Operation

When the coupling is in operation the scoop pipe 31 is inwardly swung, and fluid is in driving circulation between the impeller and runner assemblies. Fluid is also contained, in the form of a centrifugal fluid ring, within the impeller housing extension 18 and in the shell 16 with which the extension 18 communicates through the orifices 37. The fluid friction between the coupling assembly and the shell 16 causes the shell 16 to rotate at substantially the same speed as the coupling with the resultant simultaneous rotation of the connected outer shell 12 and reservoir 15.

To remove all or part of the fluid from the coupling, the scoop pipe 31 is swung towards its centrifugal fluid ring, whereby fluid is scooped therefrom to enter the fluid reservoir 15. As the shell 12 and reservoir 15 rotate at substantially the same speed as the impeller housing 2, due to fluid friction, there is very little difference between the speed of rotation of the reservoir 15 and the contained pump wheel 28 which rotates in unison with the impeller housing; consequently the reservoir 15, its contained centrifugal fluid ring and the blades 29 of the pump wheel normally have substantially the same speed of rotation. To pump fluid from the reservoir 15 to the coupling, the brake 38 is applied, which will retard or stop the rotation of the shells 12 and 16, reservoir 15 and contained centrifugal fluid ring, while at the same time the pump wheel 28 which is driven by the driving shaft 4, maintains its speed. This action creates a hydrostatic pressure in the fluid ring in the reservoir, with the resultant passage of fluid through the check valves 30 into the space 41 between the shells 12 and 16, and thence through the circular openings 42 into the space 43 between the impeller housing 2 and the shell 16 to be forced through the orifices 37 into the coupling assembly.

From the foregoing description it will be appreciated that any desired speed ratios from a full driving speed of the driven shaft down to a standstill and vice versa may be obtained through manipulation of the brake governing the rotative speed of the fluid reservoir and manipulation of the scoop pipe, and although I have shown a particular arrangement of my invention, it is to be understood that constructional changes may be made without departing from the underlying principle of the invention as set forth in the appended claims.

What I claim as my invention is:

1. In combination with a fluid coupling assembly comprising a driving shaft and an impeller housing coupled to the driving shaft, a runner housing contained within the impeller housing and coupled to a driven shaft, and a coupling bleeding scoop pipe mounted within the impeller housing and communicating with a freely mounted, fluid frictionally rotated fluid reservoir: a fluid passage extending from said reservoir to said coupling assembly defined by a pair of spaced apart inner and outer shells surrounding said coupling assembly and rotatable with said fluid reservoir; a fluid pump operatively connected between said impeller housing and said rotatable reservoir for pumping fluid from said reservoir through said fluid passage to said coupling assembly; check valve means in said fluid passage; and means for controlling the rotative speed of said reservoir.

2. The combination claimed in claim 1 and means for effecting a fluid passage between said impeller housing and said inner shell comprising a projection on said impeller housing disposed in predetermined spaced relation from said inner shell; and a plurality of peripherally arranged fluid inlet orifices in said projection of said impeller.

3. The combination claimed in claim 1 and means for effecting a fluid passage between said impeller housing and said inner shell comprising a projection on said impeller housing disposed in predetermined spaced relation from said inner shell; a plurality of peripherally arranged fluid inlet orifices in said projection of said impeller, said pump being in the form of a pump wheel operatively connected to the said impeller housing and disposed in said reservoir: and a plurality of blades in said reservoir co-operating with said pump wheel for pumping fluid from said reservoir.

4. The combination claimed in claim 1 in which the inner shell embodies a skirting member defining a partition wall between said reservoir and said coupling assembly; a bearing assembly mounting said partition wall and through which said scoop pipe extends from said reservoir to said coupling assembly.

5. The combination claimed in claim 1 in which the inner shell is disposed in predetermined spacing from said impeller housing to provide a fluid passage therebetween; a skirting member forming a part of said inner shell defining a partition wall between the reservoir and the coupling assembly; a projection on said impeller housing extending over the runner of said coupling assembly and said scoop pipe and including bearing means supporting said skirting member of said inner shell; and a plurality of fluid inlet orifices in said projecting portion of said impeller housing in communication with the fluid passage between said impeller housing and said inner shell.

JOHN EDWARD BECKER.

References Cited in the file of this patent

UNITED STATES PATENTS

| Number | Name | Date |
| --- | --- | --- |
| 2,187,656 | Kiep et al. | Jan. 16, 1940 |
| 2,550,664 | Becker | May 1, 1951 |